(12) United States Patent
Jambhekar et al.

(10) Patent No.: US 8,108,073 B2
(45) Date of Patent: Jan. 31, 2012

(54) ADAPTIVE CONTROL SYSTEM FOR REAGENT DISTRIBUTION CONTROL IN SCR REACTORS

(75) Inventors: Rajaram Jambhekar, Randolph, MA (US); Robert Lisauskas, Shrewsbury, MA (US); William Medeiros, Leominster, MA (US); Clayton Erickson, Princeton, MA (US)

(73) Assignee: Babcock Power Environmental Inc., Worcester, MA (US)

( * ) Notice: Subject to any disclaimer, the term of this patent is extended or adjusted under 35 U.S.C. 154(b) by 0 days.

(21) Appl. No.: 13/182,147

(22) Filed: Jul. 13, 2011

(65) Prior Publication Data
US 2011/0266304 A1 Nov. 3, 2011

Related U.S. Application Data

(62) Division of application No. 11/980,047, filed on Oct. 30, 2007, now Pat. No. 8,010,236.

(51) Int. Cl.
*G05B 21/00* (2006.01)
*G01N 35/08* (2006.01)
*G01N 35/00* (2006.01)
*G01N 21/00* (2006.01)

(52) U.S. Cl. ............. 700/266; 436/43; 436/50; 436/55; 422/62

(58) Field of Classification Search .................. None
See application file for complete search history.

(56) References Cited

U.S. PATENT DOCUMENTS
2005/0260761 A1* 11/2005 Lanier et al. .............. 436/55
* cited by examiner

*Primary Examiner* — Jill Warden
*Assistant Examiner* — Neil N Turk
(74) *Attorney, Agent, or Firm* — Edwards Wildman Palmer LLP; Joshua L. Jones

(57) ABSTRACT

A method for controlling dosage of a reagent in a selective catalytic reduction (SCR) system includes the step of providing the system with a plurality of reagent injection nozzles, each nozzle being configured and adapted to be independently calibrated during an SCR reaction when the system is in operation. The method further includes determining an influence coefficient for each injection nozzle for a catalyst independently of the other injection nozzles, and optimizing the flow of reagent from each injection nozzle to minimize a sum of deviation across a surface of the catalyst. A system performs selective catalytic reduction (SCR) and a machine readable medium contains program instructions to controlling dosage of a reagent in a selective catalytic reduction (SCR) system.

14 Claims, 6 Drawing Sheets

VARIATION OF CATALYST OUTLET NOx CONCENTRATION
(ppm @ 3% O2)

VARIATION OF CATALYST INLET NH3/NOx MOLE RATIO ( % variation from average removal efficiency)

VARIATION OF CATALYST OUTLET NOx CONCENTRATION
(ppm @ 3% O2)

VARIATION OF CATALYST INLET NH3/NOx MOLE RATIO
( % variation from average removal efficiency)

ADAPTIVE CONTROL SYSTEM FOR REAGENT DISTRIBUTION CONTROL IN SCR REACTORS

BACKGROUND OF THE INVENTION

1. Field of the Invention

The present invention relates to reducing $NO_X$ emissions, and more particularly, to selective catalytic reduction (SCR) systems for reducing $NO_X$ emissions.

2. Description of Related Art

A variety of devices and methods are known in the art for reducing $NO_X$ emissions in industrial settings. Of such devices, many are directed to reducing $NO_X$ emissions through SCR processes.

The combustion of fossil fuels, such as coal, oil, and industrial or natural gas produces environmentally hazardous substances, including nitric oxide (NO) and nitrogen dioxide ($NO_2$). Nitric oxide and nitrogen dioxide are collectively called nitrogen oxide, or $NO_X$. In the normal combustion process of fossil fuels, the major portion of $NO_X$ is NO. The production of $NO_X$ can occur when fossil fuel is combusted in a variety of apparatuses, including refinery heaters, gas turbine systems, and boilers, such as in steam plants. The fuel may include coal, oil, gas, waste products, such as municipal solid waste, and a variety of other carbonaceous materials. Federal, state, and regional agencies have established regulations to limit $NO_X$ emissions from power plants and other sources.

To comply with governmental regulations, $NO_X$ emissions are regulated by combustion controls or utilizing post-combustion methods. The combustion control techniques include boiler tuning, utilization of low $NO_X$ burners and/or over-fire air, fuel staging, and other techniques aimed at suppressing $NO_X$ formation. These techniques are capable of 25 to 60 percent $NO_X$ reduction efficiency. However in many cases, governmental regulations or permits require higher $NO_X$ removal efficiency. To accomplish such $NO_X$ emissions limits, post-combustion flue gas treatment methods have been commercialized. These methods include selective non-catalytic reduction (SNCR) and selective catalytic reduction (SCR) processes, combinations of the two processes, and other methods. Higher $NO_X$ removal efficiencies (80 to over 90 percent) are possible only when utilizing SCR technology.

SCR reactor technology is used to treat exhaust gases from an industrial process, such as energy production, before the gas is released into the atmosphere. The SCR reactor process relies on the use of a catalyst to treat the exhaust gas as the gas passes through the SCR reactor. Both $NO_X$ reducing agent and a catalyst reactor are required for the SCR process to proceed. Because the catalyst is an integral part of the chemical reaction, great effort is used to provide maximum exposure of the catalyst to the exhaust gas and to ensure that all the $NO_X$ comes sufficiently into contact with the catalyst and the reducing agent for treatment. In this technology, the SCR catalyst is placed in an optimum temperature window of typically between 550 to 750 degrees Fahrenheit. Because the $NO_X$ reducing agent is expensive and consumed in large quantities, new challenging problems need to be addressed concerning reagent utilization and its distribution. If the reducing agent (e.g., ammonia) is not entirely consumed in the SCR process, it may be released into the atmosphere, which is referred to as "slip." Slip increases the cost of the reagent consumption, resulting in non-optimal utilization of the reducing agent and can also cause fouling of downstream equipment. In addition, governmental regulations limit quantities of the allowable release of reagent into the atmosphere. As a result, proper control of the SCR process requires strict control of both $NO_X$ and reducing agents released into the atmosphere.

There are a number of known $NO_X$ reducing agents. A commonly used $NO_X$ reducing agent is ammonia. The principal process for the removal of $NO_X$ from the flue gas flow is the injection of a reducing agent, such as ammonia, urea, or any of a number of other known reducing agents, into the flue gas flow. For example, the selective catalytic reduction of $NO_X$ involving the injection of ammonia ($NH_3$) into a flue gas flow in the presence of a catalyst occurs as the following chemical reactions:

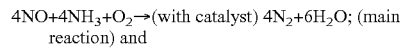
(main reaction) and

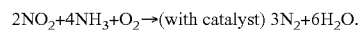

The main reaction proceeds over a catalyst layer within a temperature range of 600° F. to 750° F. Major components of the catalyst include titanium dioxide ($TiO_2$) and vanadium pentaoxide ($V_2O_5$). Additionally, tungsten oxide ($WO_3$) and molybdenum trioxide ($MoO_3$) are added to increase thermal resistance and to limit the deteriorating effects of the catalyst's poisons. Proper selection and sizing of the catalyst volume are critical to achieve the required system performance. Catalyst volume is determined based on catalyst chemical activity, assumed catalyst deactivation rate, deviation of temperature and flue gas flow, and the molar ratio of $NH_3/NO_X$ across the catalyst bed cross section.

An ammonia injection grid (AIG) is typically utilized to inject vaporized ammonia into the SCR reactor. Because of the desire in the conventional art to inject a homogenous mixture of flue gas and ammonia into the SCR reactor, the ammonia injection grid is usually located immediately "upstream" from the SCR catalyst reactor. In addition to locating the ammonia injection grid immediately before the SCR catalyst reactor, the ammonia injection grid is equipped with jet injectors to further ensure that the ammonia vapor is adequately and evenly distributed across a cross-sectional area, or face, of the catalytic reactor chamber of the SCR system.

U.S. Pat. No. 5,104,629 to Dreschler, U.S. Pat. No. 5,603,909 to Varner et al., U.S. Pat. No. 4,160,805 to Inaba et al., and U.S. Pat. No. 5,988,115 to Anderson et al., all describe various techniques for distributing reagent over a catalyst. However, although the prior art provides SCR system arrangements that are effective for high reduction of $NO_X$ concentrations in flue gas, there remain problems with implementing control of $NO_X$ emissions without emission of unreacted ammonia. The main problem with the simultaneous control of $NO_X$ and $NH_3$ emissions stems from the inability to adjust the ammonia concentration profile to the $NO_X$ concentration profile at the face of the SCR catalyst. Disparities between the ammonia concentration profile or the $NO_X$ concentration profile lead to reduced $NO_X$ efficiency (in the case of insufficient ammonia supply) or to emissions of unreacted ammonia (in the case of oversupply of ammonia). This problem is compounded by the fact that the $NO_X$ concentration profile is highly non-uniform across the catalyst face and changes with different operating parameters. Moreover, even with homogenous ammonia vapor injection, the problem of ammonia slip still occurs.

Various solutions to these problems have been suggested, for example in U.S. Patent Publication No. 2004/0057889A1 to Buzanowski (hereinafter "Buzanowski"). Buzanowski describes an ammonia distribution grid that provides control of the adjustment and distribution of ammonia injection and continuously matches the changing $NO_X$ concentration profile with an ammonia concentration profile throughout the duct. However, the system described by Buzanowski requires large numbers of ammonia injectors, valves, and sensors in the grid. Moreover, the control of a given ammonia injector in Buzanowski is based on a measurement directly downstream from the given injector, without accounting for the influence of other injectors. However, it is not always the case that each injection nozzle has a clearly defined influence field. There is usually a degree of influence from two or more injection nozzles on ammonia concentration at any single downstream location.

Past research into automatic control of SCRs has focused on transient system response to load changes. Numerous improved control schemes have been proposed to limit ammonia slip during boiler load changes. These include various feed forward strategies, fuzzy logic, and multivariable process control (MPC). Of equal importance to limiting ammonia slip is the uniform distribution of ammonia, $NO_X$, temperature and velocity across the catalyst bed. This uniformity has traditionally been achieved by careful design of the reactor, ductwork, and flue gas mixing system with the use of physical models. Ammonia distribution is then manually adjusted in the field to get to the best possible ammonia-to-$NO_X$ ratio across the catalyst bed. Physical constraints of the plant and flue gas pressure drop, however, limit the extent to which this uniformity can be achieved.

Such conventional methods and systems generally have been considered satisfactory for their intended purpose. However, there still remains a continued need in the art for improved automatic distribution of flow of reagents over catalysts in SCR systems. There also remains a need in the art for such a method and system that are inexpensive and easy to make and use. The present invention provides a solution for these problems.

SUMMARY OF THE INVENTION

The purpose and advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a method for controlling dosage of a reagent in a selective catalytic reduction (SCR) system. The method includes the step of providing the system with a plurality of reagent injection nozzles, each nozzle being configured and adapted to be independently calibrated during an SCR reaction when the system is in operation. The method further includes determining an influence coefficient for each injection nozzle for a catalyst independently of the other injection nozzles, and optimizing the flow of reagent from each injection nozzle to minimize a sum of deviation across a surface of the catalyst.

In accordance with a further aspect of the invention, the method for controlling the dosage of a reagent in a selective catalytic reduction (SCR) system includes optimizing the flow of reagent based on the following equations:

$$B_i = \sum_{j=1}^{N} K_{ij} X_j$$

-continued $$AMM_{avg} = \sum_{i=1}^{M} \frac{B_i}{M}$$

$$\sum_{i=1}^{M} D_i = \sum_{i=1}^{M} ABS\left[\frac{B_i}{A_i} - \frac{AMM_{avg}}{\sum_{j=1}^{M} \frac{A_j}{M}}\right]$$

$$\sum_{j=1}^{N} X_j = \sum_{i=1}^{M} A_i \times \eta$$

wherein:
N=Number of injection nozzles,
M=Number of grid measurement points,
$X_j$=Flow rate of ammonia at the $j^{th}$ injection nozzle,
$A_i$=NOx concentration at the inlet catalyst face in ppm at the $i^{th}$ grid measurement point,
$B_i$=Ammonia concentration in ppm at the $i^{th}$ grid measurement point,
$K_{ij}$=Influence coefficient at the $i^{th}$ grid point for the $j^{th}$ injection valve, and is defined as the fraction of the flow at the $j^{th}$ injection valve that appears at the $i^{th}$ grid point,
$AMM_{avg}$=Average ammonia concentration in ppm across the whole reactor cross section,
$D_i$=Absolute value of deviation from the mean value of ammonia to $NO_X$ ratio at the $i^{th}$ grid point, and
$\eta$=$NO_X$ Reduction Efficiency.

In accordance with a further aspect of the invention, the optimizing step can take place manually. It is also contemplated that the optimizing step can occur via an automated control system in communication with the plurality of injection nozzles. The optimizing step can occur before the SCR reaction has begun. At least one second optimization step can occur during the SCR reaction.

In further accordance with the invention, the step of determining the influence coefficient can include measuring the contaminant levels proximate at least one measurement point downstream of the injection nozzles. It is contemplated that the step of determining the influence coefficient can include measuring the contaminant levels at least one measurement point upstream of the injection nozzles and at least one point downstream of the injection nozzles. The system can have any suitable number of reagent injection nozzles. It is contemplated that the system can have fewer than 25 reagent injection nozzles, fewer than 15 reagent injection nozzles, or fewer than 5 reagent injection nozzles. It is also contemplated that the system can have as few as 2 reagent injection nozzles.

In another aspect in accordance with the present invention, each injection nozzle has a diameter from about 0.5 inches to about 10 inches. Each injection nozzle can have a diameter from about 1 inch to about 8 inches. It is also contemplated that each injection nozzle can have a diameter from about 2 inches to about 6 inches. It is also possible for the plurality of injection nozzles to form a grid system having a plurality of branches wherein at least two of the grid branches are capable of being independently calibrated.

The invention also includes a selective catalytic reduction (SCR) system. The system includes a plurality of reagent injection nozzles. Each nozzle is configured and adapted to be independently calibrated during the SCR reaction to distribute a reagent to an SCR catalyst downstream from the injection nozzles. The system further includes a plurality of detection points configured and adapted to measure at least one of reagent and contaminant levels at the SCR catalyst. An optimization system is included that is configured and adapted to determine an influence coefficient for each injection nozzle for a catalyst independently of the other injection nozzles and to determine an optimum rate of flow of reagent for each nozzle. An automated control system is in communication with the optimization system and the plurality of injection nozzles. The automated control system is configured and adapted to calibrate rate of flow from each injection nozzle to the optimum rate of flow, independently of the other injection nozzles.

In accordance with a further aspect of the invention, the optimization system is configured to determine the influence coefficient based on the reagent or contaminant levels detected at the detection points. The optimization system can be configured to determine the optimum rate of flow of reagent based on the equations shown above with respect to the methods of the invention.

It is also contemplated that the optimization system can include a computer. Moreover, the injection nozzles can be configured and adapted to distribute reagent to the catalyst by bulk mixing. It is contemplated that there can be fewer injection nozzles than detection points. The system can further include a second plurality of detection points upstream of the injection nozzles configured to measure contaminant levels at the inlet of one or more nozzles. It is also possible for there to be fewer injection nozzles than total detection points in the first and second pluralities of detection points. It is possible for the system to have half as many injection nozzles as total detection points in the first and second pluralities of detection points or less.

The invention also includes a machine readable medium containing program instructions for controlling dosage of a reagent in a selective catalytic reduction (SCR) system. The program includes a code segment for instructing a processor to determine an influence coefficient for each of a plurality of reagent injection nozzles for a catalyst independent of the other injection nozzles, wherein each nozzle is configured and adapted to be independently calibrated during an SCR reaction when the system is in operation. The program further includes a code segment for instructing the processor to optimize flow of reagent from each injection nozzle to minimize a sum of deviation across a surface of the catalyst.

In another aspect in accordance with the invention, the code segment for instructing the processor to optimize flow of reagent includes instructions to optimize based on the equations shown above with respect to the methods of the invention. The code segment for instructing the processor to optimize flow of reagent can be configured to instruct the processor to perform optimization before the SCR reaction has begun. Moreover, the program can further include a code segment for instructing the processor to perform at least one second optimization step during the SCR reaction.

A further code segment can be included for accepting measurement data from at least one measurement point wherein the code segment for instructing a processor to determine an influence coefficient for each nozzle is configured to determine the influence coefficient for each nozzle by utilizing measurement data on contaminant levels proximate at least one measurement point downstream of the injection nozzles. It is also contemplated that the code segment for instructing a processor to determine an influence coefficient for each nozzle can be configured to determine the influence coefficient for each nozzle by utilizing measurement data on contaminant levels proximate at least one measurement point upstream of the injection nozzles and at least one point downstream of the injection nozzles.

In accordance with a further aspect of the invention, the code segments for instructing a processor to determine an influence coefficient for each of a plurality of nozzles and for instructing the processor to optimize flow of reagent from each injection nozzle are configured and adapted to control the plurality of injection nozzles. In this case the injection nozzles form a grid system having a plurality of branches, wherein at least two of the grid branches are capable of being independently calibrated.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the methods and systems of the invention. Together with the description, the drawings serve to explain the principles of the invention.

DETAILED DESCRIPTION OF THE PREFERRED EMBODIMENT

Reference will now be made in detail to the present preferred embodiments of the invention, examples of which are illustrated in the accompanying drawings. A method and corresponding steps of the invention will be described in conjunction with the detailed description of the system.

The devices and methods presented herein may be used for controlling an SCR system. The present invention is particularly suited for improving the flow distribution of reagents over an SCR catalyst. In accordance with the invention, a selective catalytic reduction (SCR) system is provided. The system includes a plurality of reagent injection nozzles. Each nozzle is configured and adapted to be independently calibrated during the SCR reaction to distribute a reagent to an SCR catalyst downstream from the injection nozzles. The system further includes a plurality of detection points configured and adapted to measure at least one of reagent and contaminant levels at the SCR catalyst. An optimization system is included that is configured and adapted to determine an influence coefficient for each injection nozzle for a catalyst independently of the other injection nozzles and to determine an optimum rate of flow of reagent for each nozzle. An automated control system is in communication with the optimization system and the plurality of injection nozzles. The automated control system is configured and adapted to calibrate rate of flow from each injection nozzle to the optimum rate of flow, independently of the other injection nozzles.

Figure 1:
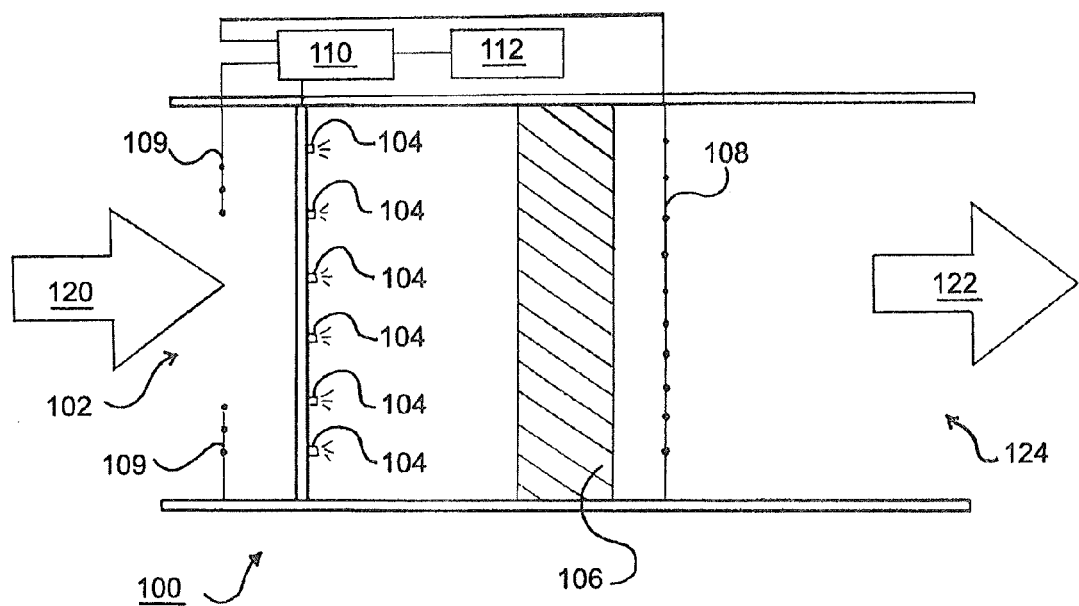
FIG. 1 is a schematic view of a first representative embodiment of an SCR system in accordance with the present invention, showing the locations of reagent/$NO_X$ probes.

For purpose of explanation and illustration, and not limitation, a partial view of an exemplary embodiment of the system in accordance with the invention is shown in FIG. 1 and is designated generally by reference character 100. Other embodiments of a system in accordance with the invention, or aspects thereof, are provided in FIG. 2 as will be described.

As depicted, an inlet 102 is provided at an upstream portion of the system 100, where untreated flue gas enters for treatment, as indicated in FIG. 1 by arrow 120. At least one reagent injection nozzle 104 is provided to inject a reagent into the untreated flue gas 120. Each nozzle 104 can be independently calibrated during operation of the SCR system 100. Nozzles 104 distribute a reagent to SCR catalyst 106, located downstream of nozzles 104. Flue gas 120 mixes with reagent from reagent injectors 104. The mixture undergoes $NO_X$ reduction as it passes SCR catalyst 106. Treated flue gas 122 passes from SCR catalyst 106 through outlet 124 and eventually out to the ambient air through a stack or other suitable structure.

Typical reagents for SCR processes include ammonia and urea, particularly in aqueous solutions. However, those skilled in the art will readily appreciate that nozzles 104 can be configured to inject any suitable reagent into system 100 without departing from the spirit and scope of the invention. While the invention can be practiced without bulk mixing devices, it is preferable for reagent to be distributed to SCR catalyst 106 by bulk mixing. Any other suitable mixing scheme can be used without departing from the spirit and scope of the invention. Moreover, while described herein as nozzles, those skilled in the art will readily appreciate that ducts or any other suitable means of supplying reagent into system 100 can be used in lieu of nozzles 104 without departing from the spirit and scope of the invention.

A plurality of sensors 108 situated in proximity to SCR catalyst 106 provide measurements of reagent concentration and/or $NO_X$ concentration to controller 110. Sensors 108 are depicted in FIG. 1 downstream of SCR catalyst 106, however it is also possible to locate sensors 108 upstream of SCR catalyst 106, or even within the structure of SCR catalyst 106.

It is not necessary for the number of sensors 108 to be the same as the number of nozzles 104. It is possible to use more nozzles 104 than sensors 108. However, it is preferable to have at least one sensor 108 per nozzle 104. In some settings, for example, there may be as few as two inlets for reagent. Nonetheless, a much greater number of sensors 108 could still be employed to control the inlets in such a system in accordance with the invention.

FIG. 1 shows a second plurality of sensors 109 located upstream of reagent injectors 104. Those skilled in the art will recognize that sensors 109 are optional. However, it is advantageous to have a second set of sensors 109 to provide measurements of contaminant levels at the inlet of one or more nozzles 104. The upstream sensors 109 measure the upstream contaminant level, which provides data for a feed forward loop in addition to the feed back loop provided by sensors 108 for controlling the amount and distribution of reagent. In embodiments of the invention that include both sets of sensors 108/109, it is possible to have fewer nozzles 104 than the total number of sensors 108/109. System 100 can operate with fewer than half as many nozzles 104 as the total number of sensors 108/109. Those skilled in the art will readily appreciate that any suitable number of sensors 108/109 can be used in conjunction with any suitable number of nozzles 104 without departing from the spirit and scope of the invention.

Control system 110 is configured and adapted to receive the measurements from sensors 108/109 and to control the flow of reagent through nozzles 104 accordingly. An optimization system 112 in communication with or included as part of control system 110 utilizes the measurements from sensors 108 to determine optimum flow rates for reagent nozzles 104. Control system 110 is connected to reagent injectors 104 and controls the flow rate of reagent from each nozzle 104 based on the determinations from optimization system 112 as to optimum rates of flow, on an independent basis for each nozzle 104.

The creation of influence coefficients can be completed separately in an off line procedure, which can be a model test, analytical test, field test, or any other suitable procedure. The influence coefficients are then used in optimization system 112 to continuously optimize distribution of reagent during operation. It is also possible to automate the process of generating influence coefficients. For instance, an additional set of sensors could be placed between nozzles 104 and catalyst 106, which in conjunction with sensors 108 could be used in a known manner to determine influence coefficients for nozzles 104. Those skilled in the art will readily appreciate that the optimization could be performed initially for a variety of operating conditions to generate a look-up table or database of optimized control parameters without departing from the spirit and scope of the invention. Thereafter, rather than continuously optimizing, the system could simply look up optimum values from the table based on measured conditions, or even interpolate optimum values using any suitable optimization scheme, to control the reagent distribution.

Previously known methods of controlling reagent flow worked on the assumption that without suitable mixing, each injection nozzle in a typical SCR system had a clearly defined non-interacting influence field downstream. However, in practice each nozzle may or may not have a clearly defined influence field, depending on the design of the static mixing system, overall system geometry, load level, etc. There is often a degree of influence from two or more injection nozzles on reagent concentration at any single downstream location. This cross influence between different injection nozzles is repeatable and can be determined from model and field-testing. These influences can be used to optimize the $NH_3$/$NO_X$ ratio across the catalyst face during either manual or automatic injection system tuning. This can be first accomplished by a series of valve influence tests where a constant reagent flow is injected through each injection nozzle individually, and then the area of influence for each valve is determined based on contaminant and/or reagent grid measurements. These tests can also be conducted in physical model studies using the injection field influence data to obtain preliminary flow estimates.

It can be assumed that there is a linear relationship between the ammonia flow at any injection nozzle and the ammonia at any measurement point on the catalyst face. From this assumption a series of linear equations can be derived to solve for the minimum variation across the catalyst face given certain system constraints. The mathematical basis for this is given below. Physical model test results and this method can be used to determine initial settings for ammonia balancing valves in order to optimize performance during field tuning of commercial SCR reactors. By "pre-tuning" prior to commissioning, the field optimization time can be greatly reduced and performance improved.

Optimization system 112 determines an influence coefficient for each injection nozzle 104. The influence coefficient for each nozzle 104 is determined independent of the other nozzles 104. The influence coefficients can then be used as output to control the rate of reagent flow through each nozzle 104 so that each nozzle 104 operates at an optimum flow rate. Optimization system 112 can be configured to calculate influence coefficients based on reagent concentration, contaminant concentration, or both, as detected by sensors 108/109. Preferably, optimization system 112 applies the following system of equations to determine the optimum rate of flow of reagent:

$$B_i = \sum_{j=1}^{N} K_{ij} X_j$$

$$AMM_{avg} = \sum_{i=1}^{M} \frac{B_i}{M}$$

$$\sum_{i=1}^{M} D_i = \sum_{i=1}^{M} ABS \left[ \frac{B_i}{A_i} - \frac{AMM_{avg}}{\sum_{j=1}^{M} \frac{A_j}{M}} \right]$$

$$\sum_{j=1}^{N} X_j = \sum_{i=1}^{M} A_i \times \eta$$

where N is the number of injection nozzles, M is the number of grid measurement points, $X_j$ is the flow rate of ammonia at the $j^{th}$ injection nozzle, $A_i$ is the $NO_X$ concentration at the inlet catalyst face in ppm at the $i^{th}$ grid measurement point, $B_i$ is the ammonia concentration in ppm at the $i^{th}$ grid measurement point, $K_{ij}$ is the influence coefficient at the $i^{th}$ grid point for the $j^{th}$ injection valve, $AMM_{avg}$ is the average ammonia concentration in ppm across the whole reactor cross section, $D_i$ is the absolute value of deviation from the mean value of ammonia to $NO_X$ ratio at the $i^{th}$ grid point, and $\eta$ is the $NO_X$ Reduction Efficiency.

The independent equations above can be represented by a matrix equation:

$$A \times B = C$$

Where A is a matrix with dimensions (2*M+2)×(N+2*M+1) and B is a vector with dimensions N+2*M+1. C is the right hand side vector (RHS) whose elements represent the constraints on the linear equations. The Objective Function to be minimized is:

$$\sum_{i=1}^{M} D_i$$

and can be minimized by the Simplex Method or any other suitable algorithm. Those skilled in the art will recognize that equivalents or variations of the equations and algorithms above, or any other suitable equations and methods of optimizing now known or later discovered can be used without departing from the spirit and scope of the invention. For example, instead of minimizing the sum of the absolute deviations it is possible to minimize the square root of the sum of the squares of the deviations, which is called minimizing the 'Root Mean Square' or RMS.

Optimization system 112 can thus find the percentage of ammonia flow passing through each injection nozzle in such a way that the RMS value of the $NH_3/NO_X$ distribution is as low as possible. Optimizing in this manner reduces slip while providing the desired level of $NO_X$ reduction over a wide variety of operating conditions. For example, previously known systems designed for full capacity loads were not well suited to prevent slip at low loads. Optimization system 112 provides significantly reduced low load slip by proper adjustment of the ammonia flow to each individual injector, maintaining a uniform distribution of reagent and contaminants across the SCR catalyst 106 over a wide range of operating conditions, including transient states.

FIG. 1 shows control system 110 and optimization system 112 as separate, connected systems. However, those skilled in the art will readily appreciate that control system 110 and optimization system 112 can be a unitary system. It is also possible for optimization system 110 to directly receive measurements from sensors 108 and/or 109 and pass optimum reagent flow information to control system 110, which controls nozzles 104 accordingly. One or more manual systems, digital or analog circuits, computers, or any other suitable device or devices can constitute control system 110 and optimization system 112. Those skilled in the art will readily appreciate that any suitable arrangement of control system 110 and optimization system 112 can be used without departing from the spirit and scope of the invention.

In further accordance with the invention, a method for controlling dosage of a reagent in a selective catalytic reduction (SCR) system is provided. The method includes the step of providing the system with a plurality of reagent injection nozzles, wherein each nozzle is configured and adapted to be independently calibrated during an SCR reaction when the system is in operation. The method also includes steps of determining an influence coefficient for each injection nozzle for a catalyst independently of the other injection nozzles, and optimizing the flow of reagent from each injection nozzle to minimize a sum of deviation across a surface of the catalyst.

Figure 2:
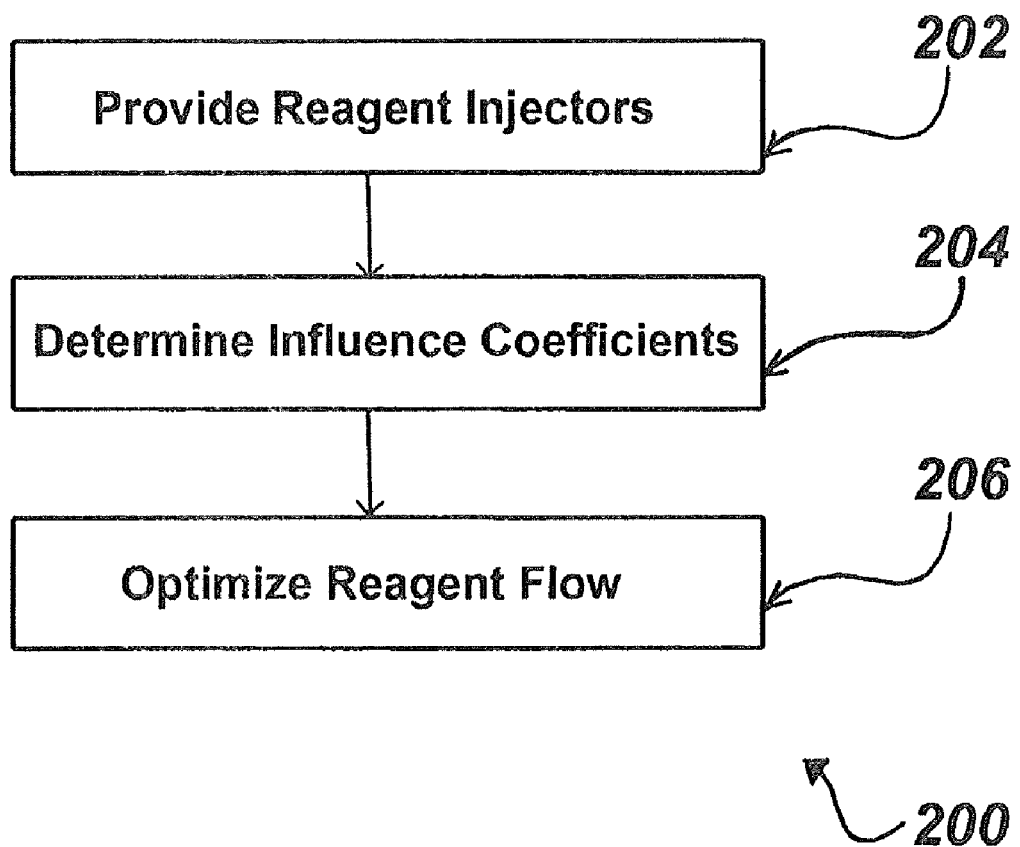
FIG. 2 is a flowchart of an SCR process in accordance with the present invention, showing the steps of controlling reagent flow rates.

For purposes of illustration and not limitation, as embodied herein and as depicted in FIGS. 1 and 2, method 202 includes a step 202 of providing a plurality of reagent injection nozzles (e.g. nozzles 104). The method further includes the step 204 of determining an influence coefficient for each nozzle. The influence coefficient for each nozzle is independent of the other nozzles and relates to how much influence the given nozzle has on the SCR catalyst bed. The influence determination for each nozzle can be can be accomplished by operating the nozzles one at a time or with different gas species and then measuring the influence near the catalyst bed over a range of operating conditions. This influence test can be done by physical scale model testing, field testing of the full scale SCR, by computational fluid dynamic methods, or by any other suitable method. As described above, the influence test can be done manually or can be automated without departing from the spirit and scope of the invention.

The method also includes a step 206 for optimizing the flow of reagent from the nozzles. The flow is optimized by minimizing the sum of deviation across a surface of the catalyst for the plurality of reagent injector nozzles, as described above. The optimization step 206 can be performed by an optimization system (e.g., 112) for a wide range of operating conditions to provide parameters for use in a controller (e.g. controller 110). The influence coefficients used by the optimization system can be determined prior to bringing the optimization system online, as described above. It is also possible to conduct periodic testing of influence coefficients in a separate calibration mode, for example by including an extra set of sensors between the nozzles and catalyst bed, as described above.

In further accordance with this embodiment of the invention, the step of optimizing reagent flow may involve solving the equations set forth above in the discussion of system 100.

This optimizing step can be a manual operation. However, it is preferable to perform the optimization by means of an automated control system that is in communication with the injection nozzles. Moreover, it is possible to perform the optimizing step before the SCR reaction begins. For example, it is possible to use the optimization on a model of a given reactor to assist in design of a system in accordance with the invention. Those skilled in the art will appreciate that such modeling can also be used to design components for retrofitting an existing system.

It is also possible to perform optimization during the SCR reaction. Optimizing during operation allows reagent flow to be dynamically adjusted in response to changes in operating load. Adjusting reagent flow during SCR operations can further reduce $NO_X$ emissions as well as reagent slip during dynamic loading.

The step of determining the influence coefficient can include measuring contaminant and/or reagent levels proximate at least one measurement point downstream of the injection nozzles. As discussed above, these measurements can be carried out using sensors (e.g. sensors 108) located downstream of the reagent nozzles. Those skilled in the art will readily appreciate that it is possible for the sensors to be located upstream of the catalyst bed, downstream of the catalyst bed, and/or integrated with the catalyst bed, without departing from the spirit and scope of the invention. Moreover, it is also possible for the step of determining influence coefficients to include measuring contaminant levels upstream (e.g., with sensors 109) of the injection nozzles in addition to measuring downstream of the nozzles.

In accordance with a further aspect of the invention, the steps of the method can be carried out for controlling dosage of a reagent through fewer than 25 reagent injection nozzles. The steps of the method can be carried out for fewer than 15 reagent injection nozzles, or fewer than 5 reagent injection nozzles. It is also possible for the method steps to be carried out where the system includes two reagent injection nozzles. It is to be understood that while embodiments of the invention are described in conjunction with reagent injector nozzles, embodiments of the invention can be used with open pipe ends or any other suitable means of injecting reagent. Those skilled in the art will readily appreciate that the method can be performed for any suitable number of reagent nozzles without departing from the spirit and scope of the invention.

It is also possible to perform the steps of the method in accordance with the invention wherein each injection nozzle has a diameter between about 0.5 inches and about 10 inches. It is also possible to perform the method for nozzle diameters between about 1 inch and about 8 inches. The steps of the method can also be performed wherein the injection nozzles are from about 2 inches to about 6 inches in diameter. Those skilled in the art will readily appreciate that nozzles of any suitable diameter can be used without departing from the spirit and scope of the invention.

The steps of the method can be carried out for systems where the injection nozzles form a grid system. It is also possible that the nozzles in such a grid system form at least two branches of the grid, each branch being capable of independent control or calibration. Moreover, while FIG. 1 shows nozzles and sensors in one-dimensional arrays, those skilled in the art will readily appreciate that any suitable grids of nozzles and sensors, including two or three-dimensional grids, can be used without departing from the spirit and scope of the invention.

The invention further includes a machine readable medium containing program instructions for controlling dosage of a reagent in an SCR system. The program includes a code segment for instructing a processor to determine an influence coefficient for each of a plurality of reagent injection nozzles for a catalyst independent of the other injection nozzles. Each nozzle is configured and adapted to be independently calibrated during an SCR reaction when the system is in operation. A further code segment is included for instructing the processor to optimize flow of reagent from each injection nozzle to minimize a sum of deviation across a surface of the catalyst.

For purposes of illustration and not limitation, as embodied herein and as depicted in FIG. 1, the code segment for instructing the processor to determine an influence coefficient for each of a plurality of reagent injection nozzles (e.g., nozzles 104) for a catalyst determines the coefficients for each nozzle independently. Another code segment instructs the processor to optimize the flow of reagent from each injection nozzle to minimize a sum of deviation across the surface of the SCR catalyst. The code segment for optimizing can include code to optimize flow of reagent based on the equations described above with respect to system 100. It is possible for the code segment for optimizing to be configured to optimize before the SCR reaction has begun, as when modeling for design purposes. It is also possible for the code segment for optimizing to include code for an optimization step to occur during the SCR reaction. The code is provided with influence coefficients determined by physical scale model testing, field testing of a full scale SCR, computational fluid dynamic methods, or any other suitable method as described above. Once this is done, the code can automatically optimize the distribution of reagent.

In further accordance with the invention, an additional code segment can be included for accepting measurement data from at least one measurement point. The code segment for determining influence coefficients in this case could be configured to determine the influence coefficient for each nozzle by utilizing measurement data on contaminant levels or reagent levels proximate at least one measurement point downstream of the injection nozzles. In the case where measurement data is available for points upstream and downstream of the injection nozzles, the code segment for determining an influence coefficient for each nozzle can be configured to determine influence coefficients based on the upstream and downstream measurements. The code segment for determining coefficients can also be adapted for systems including a grid of nozzles with a plurality of branches wherein at least two of the branches are capable of being independently calibrated.

Figure 3:
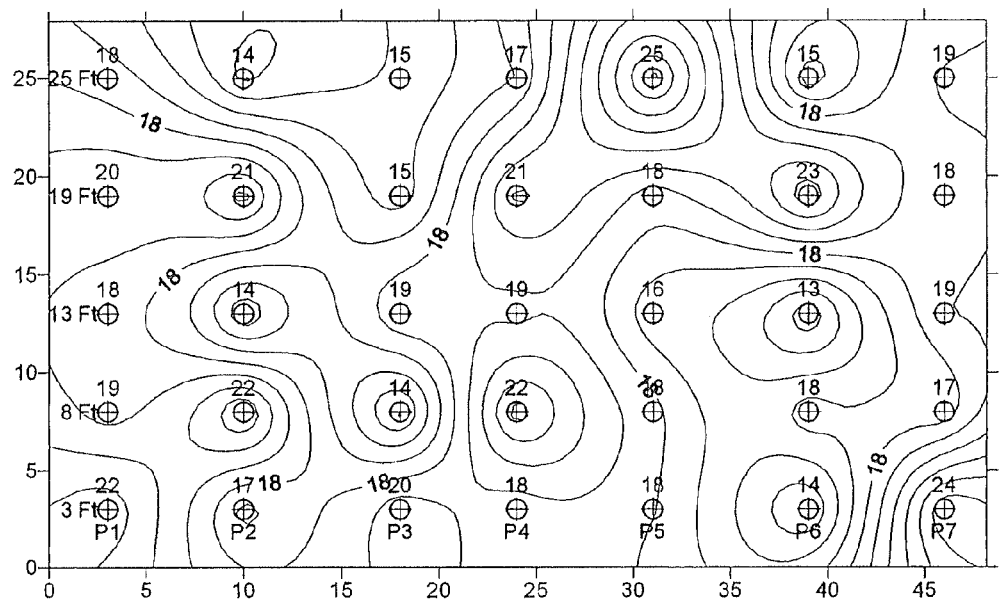
FIG. 3 is a plot of $NO_X$ concentration at the outlet of the catalyst modeled with an optimization system in accordance with the present invention.
Figure 4:
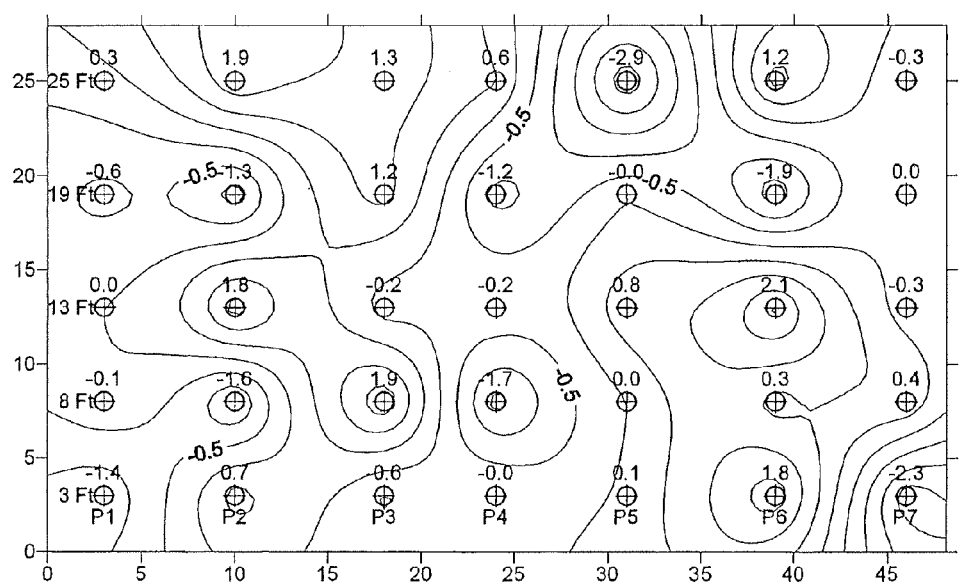
FIG. 4. is a plot of variation in inlet $NH_3/NO_X$ distribution at the inlet of the catalyst modeled with an optimization system in accordance with the present invention.

By way of example and not limitation, an exemplary implementation of the systems and methods of the invention was tested on an SCR reactor with results shown in FIGS. 3-6. Sensors were used to determine influence coefficients in the SCR reactor by testing each of four reagent outlets and determining an influence coefficient for each, as described above. These influence coefficients were used in a computer model of the system in accordance with the optimization technique described above. The model determined an optimum flow rate for each reagent outlet. Using these optimum flow rates, it was also possible to model expected $NO_X$ concentration at the catalyst outlet, as shown in FIG. 3, as well as $NH_3/NO_X$ molar ratios at the catalyst inlet, as shown in FIG. 4. Thus, FIGS. 3-4 represent the expected best possible operating conditions for the SCR reactor.

Figure 5:
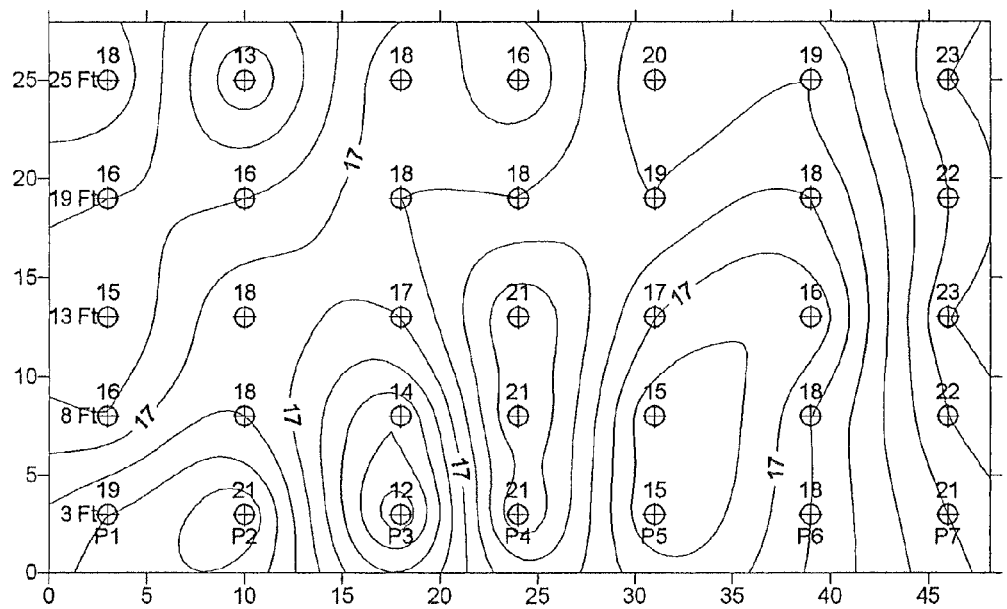
FIG. 5. is a plot of field data of $NO_X$ concentration at the outlet of the catalyst for wherein reagent flow was determined by the model in accordance with the invention.
Figure 6:
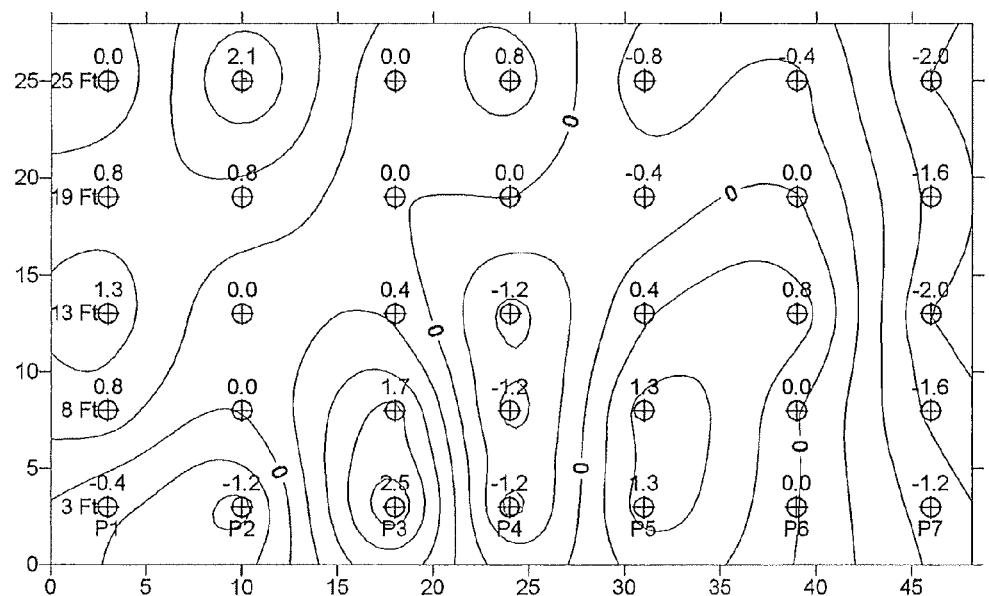
FIG. 6 is a plot of field data of variation in inlet $NH_3/NO_X$ distribution at the inlet of the catalyst wherein reagent flow was determined by a model in accordance with the present invention.

The optimum flow rates from the model for the four reagent outlets were then implemented in the field on the SCR reactor. Measurements of actual $NH_3/NO_X$ molar ratios and $NO_X$ concentration were obtained for thirty-five points at the inlet and outlet of the SCR catalyst, respectively. FIG. 5 shows the actual $NO_X$ concentrations measured at the catalyst outlet, which can be compared to FIG. 3 (the circles indicate sensor locations). The actual $NH_3/NO_X$ molar ratios measured at the catalyst inlet are shown in FIG. 6, which can be compared to FIG. 4 (with circles indicating sensor locations). To validate the valve settings obtained by the optimization system, the valve settings were varied in the field from the modeled optimum values. Varying the valve settings in this manner resulted in deterioration in $NO_X$ distribution and $NH_3/NO_X$ ratio, thus demonstrating that the modeled valve settings were indeed optimal.

Retrofitting existing systems is an intended use for incorporating the systems, methods, and computer code of the invention. Those skilled in the art will readily appreciate that the invention can be practiced on existing systems, new systems, and for designing contemplated systems not yet in existence.

All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Block diagrams and other representations of methodologies herein represent conceptual views of illustrative circuitry, other mechanisms and software embodying the principles of the invention employed in embodiments of the system and machine readable program of the invention.

Similarly, it will be appreciated that the system flows described herein represent various processes which may be substantially represented in computer-readable medium and so executed by a computer or processor in combination with appropriate flow system hardware, whether or not such computer or processor is explicitly shown. Moreover, the various processes disclosed herein can be understood as representing not only processing and/or other functions but, alternatively, as blocks of program code that carry out such processing or functions.

The present invention, as described above and shown in the drawings, provides for controlling dosage of a reagent in SCR reduction systems with superior properties including low slip during steady state, transient, and low load conditions. It will be apparent to those skilled in the art that various modifications and variations can be made in the devices and methods of the present invention without departing from the spirit or scope of the invention. Thus, it is intended that the present invention include modifications and variations that are within the scope of the appended claims and their equivalents.

What is claimed is:

1. A method for controlling dosage of a reagent in a selective catalytic reduction (SCR) system comprising the steps of:
   a) providing the system with a plurality of reducing agent injection nozzles, each nozzle being configured and adapted to be independently calibrated during an SCR reaction when the system is in operation;
   b) determining an influence coefficient for each injection nozzle for a catalyst independently of the other injection nozzles, wherein the influence coefficient for each injection nozzle is based on a constant flow from the respective nozzle and a fraction of the constant flow that appears at each of a plurality of downstream grid points; and
   c) optimizing flow of reducing agent from each injection nozzle based on the influence coefficients to minimize a sum of deviation from the mean value of reducing agent to $NO_x$ ratio across a surface of the catalyst, wherein the flow of reducing agent is optimized based on the following equations:

$$B_i = \sum_{j=1}^{N} K_{ij} X_j$$

$$AMM_{avg} = \sum_{i=1}^{M} \frac{B_i}{M}$$

$$\sum_{i=1}^{M} D_i = \sum_{i=1}^{M} ABS\left[\frac{B_i}{A_i} - \frac{AMM_{avg}}{\sum_{j=1}^{M} \frac{A_j}{M}}\right]$$

$$\sum_{j=1}^{N} X_j = \sum_{i=1}^{M} A_i \times \eta$$

wherein:
   N=Number of Injection nozzles,
   M=Number of grid measurement points,
   $X_j$=Flow rate of reducing agent at the $j^{th}$ injection nozzle,
   $A_i$=$NO_x$ concentration at the inlet catalyst face in ppm at the $i^{th}$ grid measurement point,
   $B_i$=Reducing agent concentration in ppm at the $i^{th}$ grid measurement point,
   $K_{ij}$=Influence coefficient at the $i^{th}$ grid point for the $j^{th}$ injection valve, and is defined as the fraction of the flow at the $j^{th}$ injection valve that appears at the $i^{th}$ grid point,
   $AMM_{avg}$=Average reducing agent concentration in ppm across the whole reactor cross section,
   $D_i$=Absolute value of deviation from the mean value of reducing agent to $NO_x$ ratio at the $i^{th}$ grid point, and
   $\eta$=NOx Reduction Efficiency.

2. A method for controlling the dosage of a reagent in a selective catalytic reduction (SCR) system as recited in claim 1, wherein the optimizing step occurs manually.

3. A method for controlling the dosage of a reagent in a selective catalytic reduction (SCR) system as recited in claim 1, wherein the optimizing step occurs via an automated control system in communication with the plurality of injection nozzles.

4. A method for controlling the dosage of a reagent in a selective catalytic reduction (SCR) system as recited in claim 1, wherein the optimizing step occurs before the SCR reaction has begun.

5. A method for controlling the dosage of a reagent in a selective catalytic reduction (SCR) system as recited in claim 4, further comprising at least one second optimization step which occurs during the SCR reaction.

6. A method for controlling the dosage of a reagent in a selective catalytic reduction (SCR) system as recited in claim 1, wherein the step of determining the influence coefficient includes measuring the contaminant levels proximate at least one measurement point downstream of the injection nozzles.

7. A method for controlling the dosage of a reagent in a selective catalytic reduction (SCR) system as recited in claim 6, wherein the step of determining the influence coefficient includes measuring the contaminant levels at least one measurement point upstream of the injection nozzles and at least one point downstream of the injection nozzles.

8. A method for controlling the dosage of a reagent in a selective catalytic reduction system as recited in claim 1, wherein the system has fewer than 25 injection nozzles.

9. A method for controlling the dosage of a reagent in a selective catalytic reduction system as recited in claim 8, wherein the system has 2 injection nozzles.

10. A method for controlling the dosage of a reagent in a selective catalytic reduction (SCR) system as recited in claim 1, wherein each injection nozzle has a diameter from about 0.5 inches to about 10 inches.

11. A method for controlling the dosage of a reagent in a selective catalytic reduction (SCR) system as recited in claim 10, wherein each injection nozzle has a diameter from about 1 inch to about 8 inches.

12. A method for controlling the dosage of a reagent in a selective catalytic reduction (SCR) system as recited in claim 11, wherein each injection nozzle has a diameter from about 2 inches to about 6 inches.

13. A method for controlling the dosage of a reagent in a selective catalytic reduction (SCR) system as recited in claim 1, wherein the plurality of injection nozzles forms a grid system having a plurality of branches wherein at least two of the grid branches are capable of being independently calibrated.

14. A machine readable medium containing program instructions for controlling dosage of a reagent in a selective catalytic reduction (SCR) system, the program comprising:
   a) a code segment for instructing a processor to determine an influence coefficient for each of a plurality of reducing agent injection nozzles for a catalyst independent of the other injection nozzles, wherein each nozzle is configured and adapted to be independently calibrated during an SCR reaction when the system is in operation, wherein the influence coefficient for each injection nozzle is based on a constant flow from the respective nozzle and a fraction of the constant flow that appears at each of a plurality of downstream grid points; and
   b) a code segment for instructing the processor to optimize flow of reducing agent from each injection nozzle based on the influence coefficients to minimize a sum of deviation from the mean value of reducing agent to $NO_x$ ratio across a surface of the catalyst, wherein the code segment for instructing the processor to optimize flow of reducing agent includes instructions to optimize based on the following equations:

$$B_i = \sum_{j=1}^{N} K_{ij} X_j$$

$$AMM_{avg} = \sum_{i=1}^{M} \frac{B_i}{M}$$

$$\sum_{i=1}^{M} D_i = \sum_{i=1}^{M} ABS \left[ \frac{B_i}{A_i} - \frac{AMM_{avg}}{\sum_{j=1}^{M} \frac{A_j}{M}} \right]$$

$$\sum_{j=1}^{N} X_j = \sum_{i=1}^{M} A_i \times \eta$$

wherein:
N=Number of Injection nozzles,
M=Number of grid measurement points,
$X_j$=Flow rate of reducing agent at the $j^{th}$ injection nozzle,
$A_i$=NOx concentration at the inlet catalyst face in ppm at $i^{th}$ the grid measurement point,
$B_i$=Reducing agent concentration in ppm at the $i^{th}$ grid measurement point,
$K_{ij}$=Influence coefficient at the $i^{th}$ grid point for the $j^{th}$ injection valve, and is defined as the fraction of the flow at the $j^{th}$ injection valve that appears at the $i^{th}$ grid point,
$AMM_{avg}$=Average reducing agent concentration in ppm across the whole reactor cross section,
$D_i$=Absolute value of deviation from the mean value of reducing agent to $NO_x$ ratio at the $i^{th}$ grid point, and
$\eta$=NOx Reduction Efficiency.

* * * * *